United States Patent [19]
Truebe et al.

[11] Patent Number: 6,102,619
[45] Date of Patent: Aug. 15, 2000

[54] FLOW INDUCER FISH GUIDE AND METHOD OF USING SAME

[75] Inventors: Jonathan Paul Truebe; Eric Paul Truebe, both of Mirror Lake, N.H.

[73] Assignee: Current Solutions, L.L.C., Boston, Mass.

[21] Appl. No.: 09/101,900

[22] PCT Filed: Jun. 9, 1998

[86] PCT No.: PCT/US98/11488

§ 371 Date: Jul. 20, 1998

§ 102(e) Date: Jul. 20, 1998

[87] PCT Pub. No.: WO98/56241

PCT Pub. Date: Dec. 17, 1998

Related U.S. Application Data

[60] Provisional application No. 60/049,315, Jun. 10, 1997.

[51] Int. Cl.[7] .................................................... F02B 8/08
[52] U.S. Cl. ................. 405/81; 405/80; 119/219
[58] Field of Search .................... 405/80, 81, 82, 405/83; 119/215, 219, 220, 221, 222

[56] References Cited

U.S. PATENT DOCUMENTS

| | | |
|---|---|---|
| 1,722,596 | 7/1929 | Ross . |
| 2,169,249 | 8/1939 | Holmes et al. . |
| 2,751,881 | 6/1956 | Burkey . |
| 2,761,421 | 9/1956 | Burkey . |
| 4,029,049 | 6/1977 | Hillier . |
| 4,260,286 | 4/1981 | Buchanan . |
| 4,437,431 | 3/1984 | Koch . |
| 5,263,793 | 11/1993 | Sirovich et al. . |
| 5,632,572 | 5/1997 | Chicha . |
| 5,673,449 | 10/1997 | Henriksson et al. . |

FOREIGN PATENT DOCUMENTS

| | | | |
|---|---|---|---|
| 5-263408 | 10/1993 | Japan . | |
| 2004680 | 9/1990 | Russian Federation . | |
| 1355659 | 11/1987 | U.S.S.R. | 405/81 |
| 1781377 | 12/1992 | U.S.S.R. | 405/81 |

OTHER PUBLICATIONS

Environmental Issues and Mitigative Approaches; ASCE/EPRI Guides 1989.

Opportunity for Discovery; by Steve Rainey, PE.

In Our Hands (newsletter); ITT Industries; two pages; Autumn, 1999.

*Primary Examiner*—Eileen Dunn Lillis
*Assistant Examiner*—Frederick L. Lagman
*Attorney, Agent, or Firm*—Burns, Doane, Swecker & Mathis LLP

[57] ABSTRACT

An apparatus for generating a current to guide fish includes a propeller; a device to rotate the propeller; and a frame to mount the propeller and the device to rotate the propeller. Fish may be guided from an intake area to a fish bypass by generating a current leading away from the intake area. The apparatus may also be used to guide fish through low velocity areas in river situations.

23 Claims, 10 Drawing Sheets

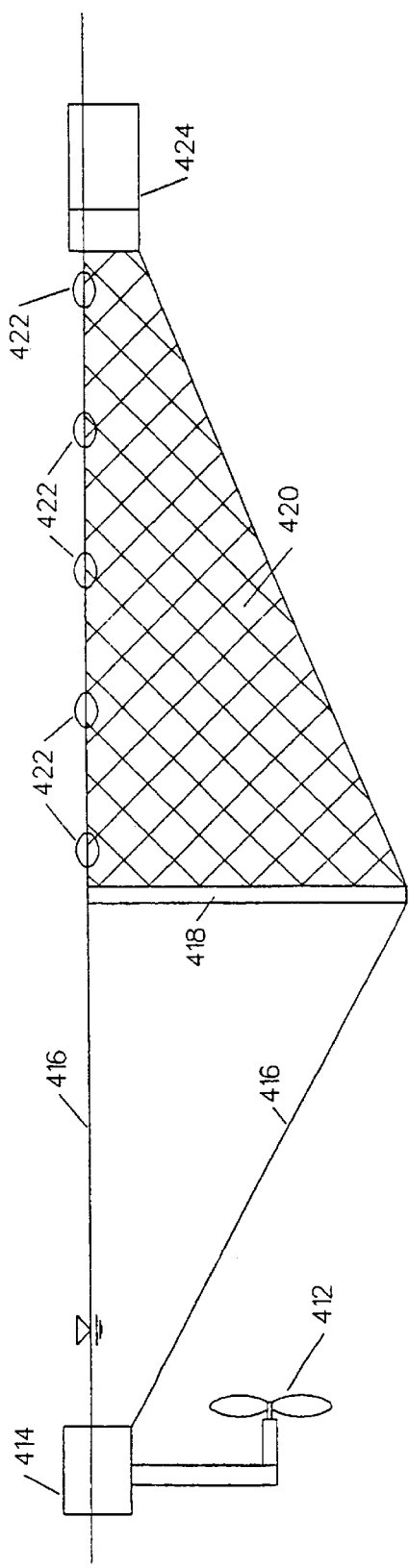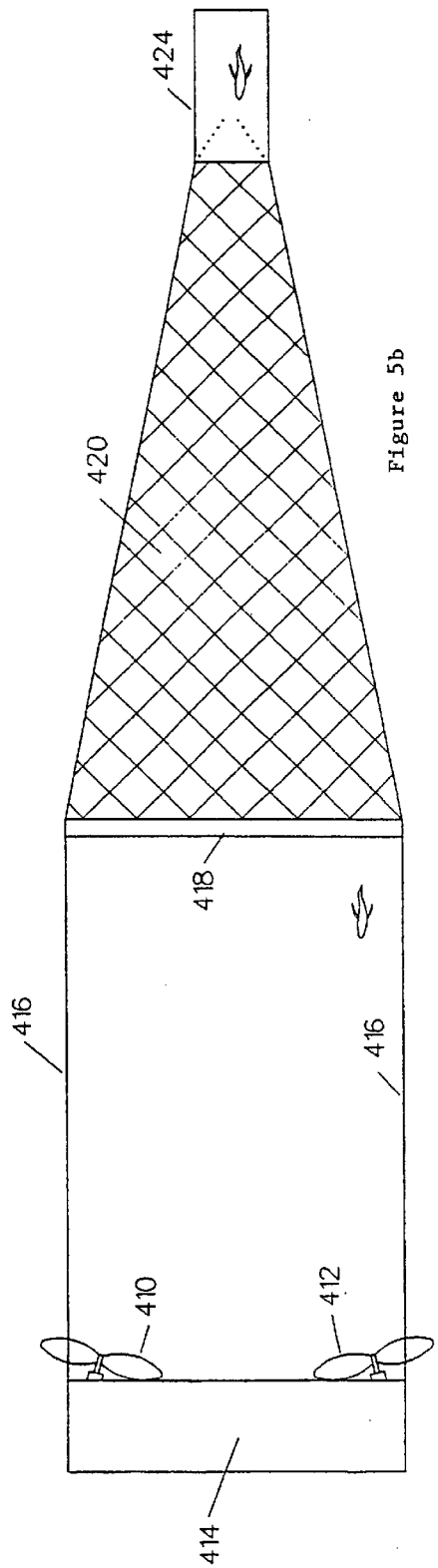
Figure 5a
Figure 5b

FLOW INDUCER FISH GUIDE AND METHOD OF USING SAME

This application is a 371 of PCT/US98/11488 filed Jun. 9, 1998, also claims the benefit of U.S. Provisional No. 60/049,315 filed Jun. 10, 1997.

BACKGROUND OF THE INVENTION

1. Field of Invention

This invention relates to a method and apparatus for modifying the behavior of fish. Specifically, it relates to a method and apparatus that modifies fish travel patterns by mechanically generating a current which creates a velocity head differential that fish can sense to guide them during their migration.

2. Description of Related Art

There is currently a conflict between the value of fish, especially with the decline of certain fish stocks, and the value of man-made devices that pose a risk to these fish. These devices may include hydroelectric power plants, municipal water intakes, thermal power plants, and irrigation systems.

Fish can be delayed when not properly directed to a bypass or when there is not sufficient current to guide them.

Fish can also suffer high mortalities when they come in contact with pumps or turbines, when they are subject to temperature variations induced by plants, or when they are pumped through irrigation systems and discharged onto fields.

Fish passage facilities, constructed to allow fish to navigate around hazards or obstacles, can be broken down into two general categories, those for upstream passage and those for downstream fish passage.

Upstream fish passage facilities typically incorporate some type of a structure to enable fish to swim up steep inclines. Traditional upstream fishways use a static head differential at the entrance of the fishway to create a current, attracting fish to the fishway. The static head differential is created by pumping water into a basin, where it then spills over a weir or through an orifice or slot. This generates a current field of limited influence, delaying the time fish are searching for the entrance.

Downstream fish passage systems consist of a barrier to keep fish out of the plant intake, and a physical structure to route them around the plant. Various physical devices and systems have been developed to prohibit fish entrance to or guide fish away from these potentially hazardous areas. These devices can be broken down into behavioral deterrents and physical barriers. Physical barriers work by limiting the opening size of the intake such that a certain fish species or life stage of fish can not enter. This includes barriers such as closely spaced bar racks, traveling screens, and fixed screens. The disadvantages of these structures are that they are difficult and expensive to construct and maintain. They can also limit the water flow into the intake, thereby limiting power production or quantity of water available. These structures can also result in impingement of fish on the intake.

Behavioral deterrents rely on fish behavior to divert fish from an intake. These deterrents include lights, electric fields, velocity/turbulence, and sound deterrents. Underwater lights (including strobes) are species-specific, and the visibility of lights, and therefore their effectiveness, is reduced in turbid water. There are three major concerns with underwater electric fields. They present a human safety concern, they are variable depending on the conductivity of water, and the fields that are effective for some fish species may be lethal to other species. Velocity/turbulence deterrents, such as air bubble curtains and waterjets, are energy intensive and don't affect some species. It is difficult to establish an uninterrupted barrier and guide with underwater sound deterrents, and long term reliability is questionable with the present generation of sound generators. Also, the frequency and amplitude of the sound wave must be tuned for each individual species, and even life stage, of fish.

Bypass structures work by releasing a certain amount of water. This discharge gives the fish water to swim in, and also creates an attraction current upstream of the bypass entrance. By discharging the water in front of the bypass, a void is created that the surrounding water fills. This movement of water toward the void creates the attraction current. This is known as a negative static head differential. One problem associated with these bypasses is that the field of attraction current is limited unless a large quantity of water is bypassed, which results in lost revenue.

There is presently limited prior art concerning the mechanical generation of currents by a velocity head differential to guide fish from hazardous areas. While migrating, fish use the water current as a guide, whether traveling upstream to spawn or downstream to the sea. As was previously mentioned, fish passage systems routinely generate currents to guide fish by a static head differential. This involves creating a situation where water falls from a higher elevation to a lower elevation. This develops an increase in water velocity and therefore a current.

Other prior art related to the mechanical generation of currents uses waterjets to create currents to guide fish. See U.S. Pat. Nos. 4,437,431 and 5,632,572. These methods are very complex, energy intensive, and more expensive than propeller generated currents.

OBJECTS AND SUMMARY

The present invention has many objects. Among them are:

to provide a fish guidance system that is cost effective;

to provide a fish guidance system that is comprised of commercially available components;

to provide a fish guidance system that is adjustable for different site conditions;

to provide a reasonably portable and deployable fish guidance system;

to provide an easily maintainable fish guidance system;

to provide a fish guidance system which will reduce water used for fish passage;

to provide a fish guidance system that will facilitate routine plant operations;

to provide a fish guidance system which keeps fish in their river environment to reduce disease transmission and boost public relations;

to provide a fish guidance system which eliminates physical handling of fish; and to provide a fish guidance system which does not require a static head differential.

Further objects and advantages of the invention will become apparent from a consideration of the drawings and ensuing description.

BRIEF DESCRIPTION OF THE DRAWINGS

FIGS. 5(a) and 5(b) show current inducers according to the present invention used in conjunction with a surface collector.

DETAILED DESCRIPTION OF THE PREFERRED EMBODIMENTS

The present invention is typically used in conjunction with a hydroelectric site that includes a dam and a turbine. An object of the present invention is to divert fish from the intake portion of the dam site so that they are not endangered by the turbine operation.

A typical embodiment of the current inducer system 1 includes a low speed, high thrust propeller 10 with an appropriate device 12 to power its rotation. To vary the thrust of the system, the pitch, diameter, and speed of rotation of the propeller 10 may be varied, along with the motor horsepower.

Figure 7:
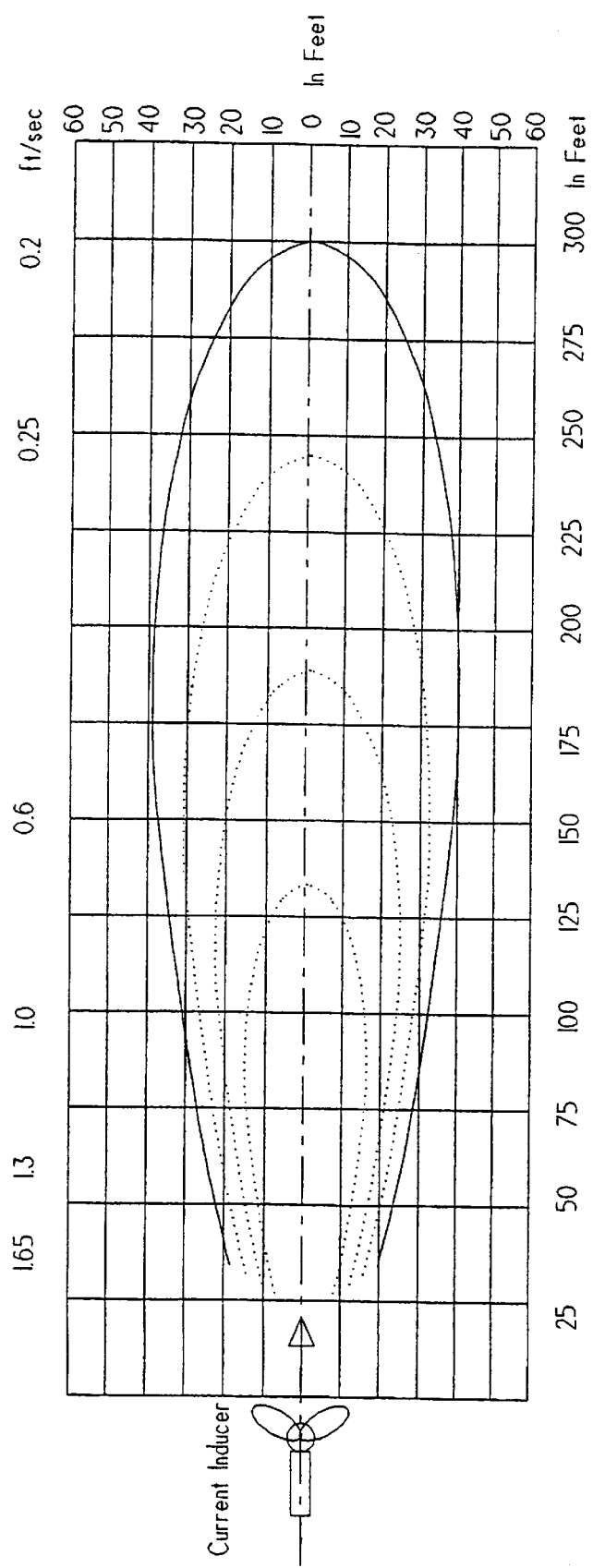
FIG. 7 shows approximate water velocity distribution curves.

There is an interrelationship between all these elements, and it is suggested that water velocity distribution curves, such as those illustrated in FIG. 7, showing water velocity generated at different ranges, be obtained from manufacturers of candidate systems. For increased directional thrust and efficiency, the propeller may be ducted or have guide vanes on its discharge. The motor or device 12 to power its rotation may be electric, hydraulic, or pneumatic powered. If it is not of sufficiently low speed, a gearbox may be incorporated in line with the motor to reduce the speed.

There are a number of different commercially available systems with possible application. These may include, but are not limited to: the submersible mixer line by Flygt Co., Trumbull, Conn.; circulator systems by Acqua and Company, Cadelbosco Sopra, Italy; and manufacturers of thrusters for ships.

The motor 12 and propeller 10 are mounted in a substantially rigid frame 14. This frame 14 is adequately rigid to transfer force from the propeller 10 to the water. The frame 14 is adjustable to permit rotation and tilt of the propeller 10. It also supports a trashrack 24 on the suction side of the propeller 10 to prevent large debris from impacting the blades of the turbine. Finally, the frame 14 incorporates a platform 26 to provide access to the propeller 10 and motor 12 for operation and maintenance.

Control of the current inducer may range from simple manual operation to complete automation depending on site characteristics. The main features to control include: on/off, speed control of the motor, the tilt, rotation, and depth of the propeller, and the number of units active. It is desirable to control these aspects of the current inducer to maintain a leading current to the bypass throughout changing river and turbine flow conditions. Therefore, the motor speed and propeller rotation may be correlated to the turbine control. For example, when the turbine shuts down, the output thrust of the current inducer may be reduced, the propeller may be redirected to face downstream, keeping the leading current aimed toward the bypass. Furthermore, when the turbine is on, the output thrust of the propeller 10 may be increased, and the propeller 10 may be redirected across or upstream. Additionally, the number of units active could be changed to match the turbine flow.

Figure 8A:
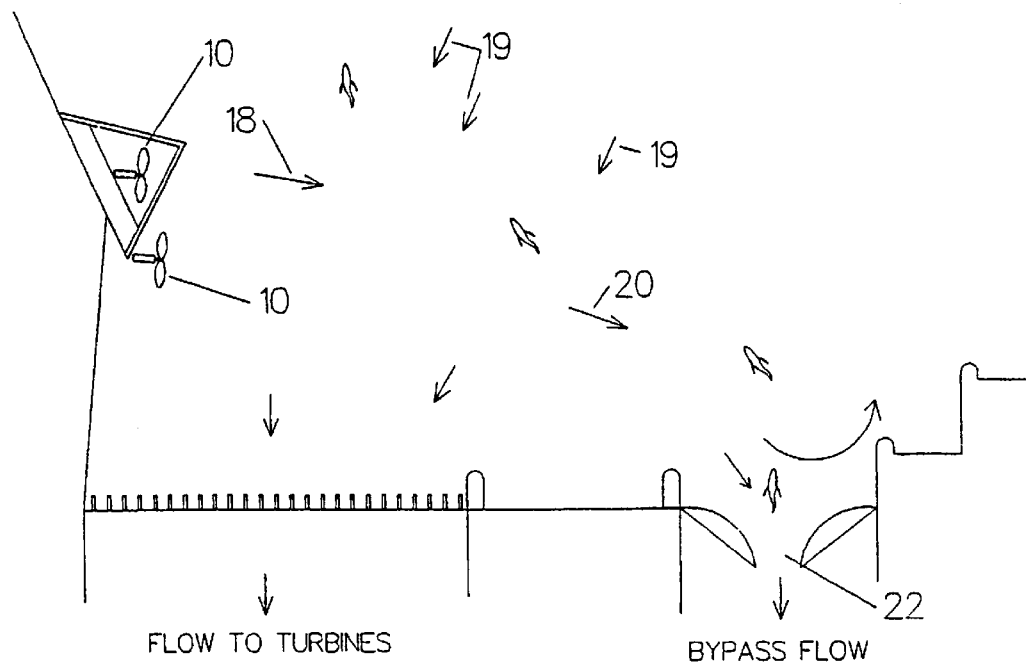
FIGS. 8(a) and 8(b) show flow inducer adjustments for different turbine flows.
Figure 8B:
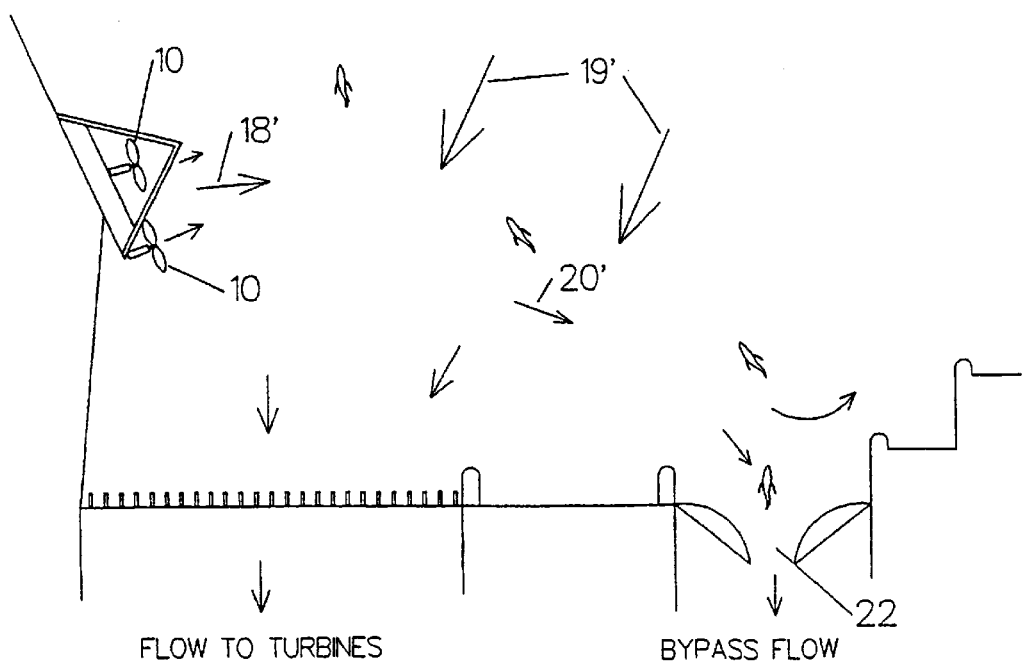

FIG. 8(a) illustrates a low turbine flow condition, wherein current vectors 19 due to turbine flow are low. In this condition, the current vectors 18 due to the propellers 10 should be set relatively small and directed with a downstream component. The resultant current 20 flows toward the bypass 22. On the other hand, FIG. 8(b) illustrates a high turbine flow condition. In this situation, the current vectors 19' due to the turbine flow are large. The current inducer in this case should be set such that the current vectors 18' resulting from the propellers 10 are higher and directed more across or upstream. The resultant current 20' also flows toward the bypass 22.

The characteristics of the target species of fish to be influenced should be determined and considered. These characteristics include the depth at which the fish move in the water column, and the minimum velocity threshold of the fish. This establishes the height at which the current must be generated, and how strong the current must be to influence the fish.

A velocity study of the area where the currents are to be modified is then performed. In the case of a hydroelectric site, the current generated in the forebay due to turbine flow must be measured. Equipment is then selected based on the water velocity distribution curves and located such that a current greater than the fish's minimum velocity threshold can be generated toward the downstream bypass at all turbine flows. Due to the wide variety of commercially available equipment, this selection process is relatively easy.

The location of the current inducer is also site dependent. In any case, the current inducer should be located upstream of the turbine intake such that the current vector 18 from the current inducer, when combined with the current vector 19 due to turbine flow, creates a current 20 leading to the bypass 22. Once this location is determined and the current inducers are installed, the actual current produced should be checked with a velocity study. This can be fine tuned by adjusting the direction and speed of the propeller 10 in the frame to change the angle and tilt of the current inducers.

A description of the selection process is further explained with regard to a specific example. In the example, the site has a 27 ft. wide, 35 ft. deep trashrack and the turbines are capable of passing 2100 cfs. There is an existing bypass approximately 35 ft. from the trashrack. A velocity survey, using drogues and a propeller meter, was performed in the forebay to obtain baseline current data. The target species for downstream fish passage was Atlantic Salmon smolts, which typically travel within the top six feet of the water column.

Figure 1:
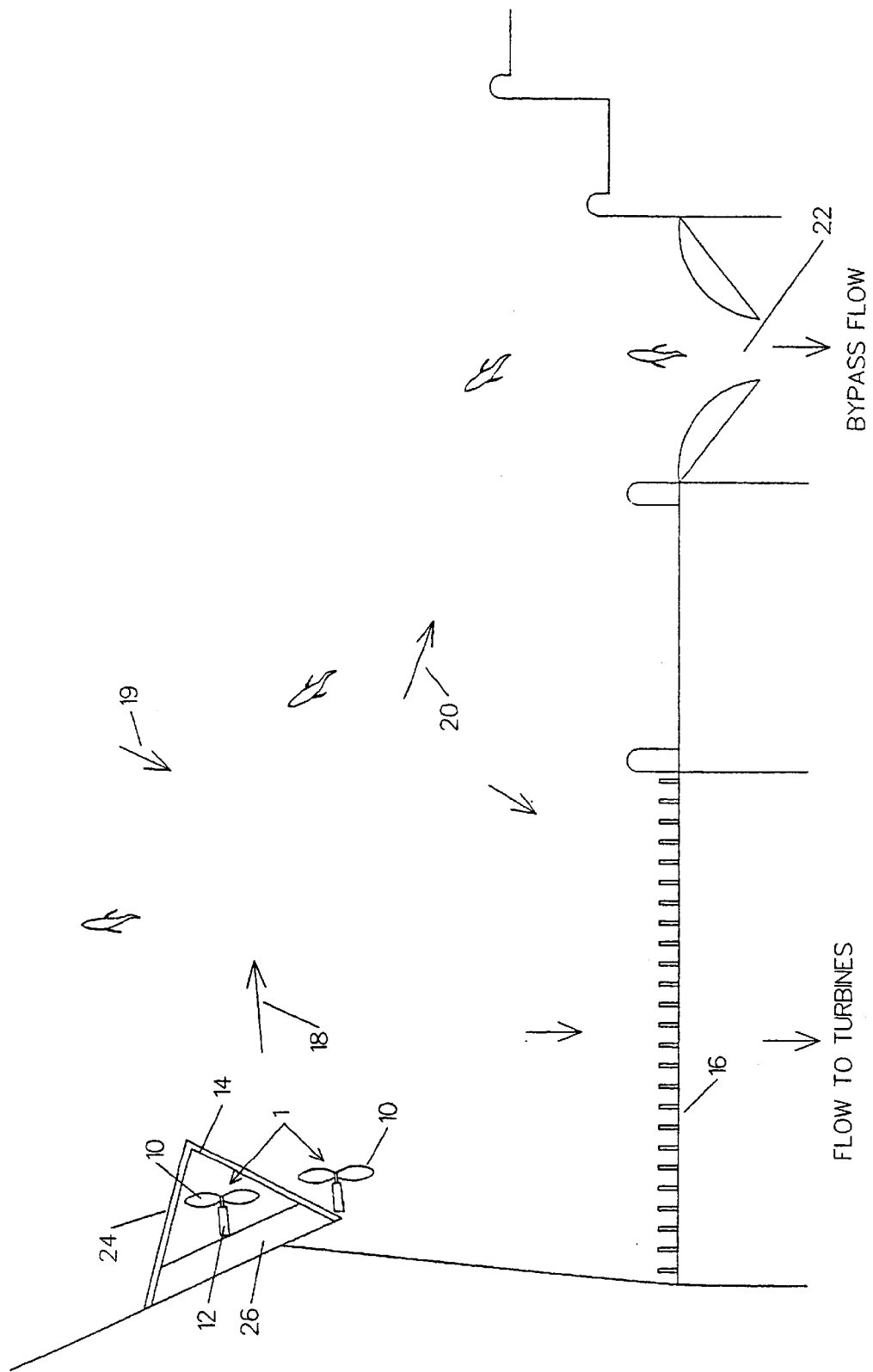
FIG. 1 shows a current inducer according to the present invention creating a current across an intake to a bypass.

Taking into consideration these site and species characteristics, a surface current was created passing upstream of the intake and leading toward the bypass. To create this current, two 2 horsepower circulators were selected. This was based on manufacturer data showing each circulator generates an approximate flow of at least 2000 cfs at 65 feet, which is the distance from the far side of the trashrack 16 to the bypass 22. See FIG. 1. That arrangement creates a velocity well above the minimum velocity threshold that the salmon are capable of detecting, and would compete well with the deep turbine intake and its associated currents. The circulators have a propeller diameter of 3 feet and spin at 900 rpm. Two were selected and mounted at different pitches to create a continuous current down to 6 feet. The propellers 10 were mounted in a steel frame 14 which was hung from a concrete retaining wall. This frame allows rotation and tilt of the propellers 10, and provided a platform 26 from which to hang a trashrack 24 upstream of the current inducers.

In other applications, the current inducers may be mounted directly on the trashrack 16 or mounted on floats and anchored to the river bottom, as long as the system is rigid enough to transfer a satisfactory current to the water.

The current inducers work by developing a velocity head differential directly by the force of the propeller blades on the water. This is different from other typical fish passage systems that generate an attraction current by first creating a static head differential by pumps or other means, then allowing the water to flow, thereby creating a velocity head differential and a current. The direct conversion method used by the present invention is more efficient and allows more flexibility in the design of fish passage systems.

The term current inducer is used because the propeller initially creates a high water velocity in a small area directly in front of the propeller. As this water passes by adjacent stationary water molecules, friction between the molecules induces a current into a larger area, while reducing the overall velocity of the water. This creates a relatively low velocity guiding current similar to the natural environment, rather than a high current that might be a deterrent to fish.

Once the current inducer is installed, fish will follow the natural current in the river until they reach the current field from the current inducer. They will then follow this artificially generated current until they reach the bypass 22 entrance.

The present invention provides a number of advantages to the field of fish passage:

(a) There is a wide selection of commercially available equipment. This reduces the cost of the system and allows flexibility to select appropriately sized equipment to meet site conditions.

(b) The current field from the system can easily be fine-tuned with frame adjustments, number of units employed, and speed control on the units.

(c) The current inducers produce a definitive fish lead. The induced current is more effective with fish than other behavioral deterrents, such as strobes and sound deterrents, whose influence field is not well defined.

(d) The system is relatively portable and can easily be deployed for the fish migration period. The current inducers also have low power requirements compared to other behavioral deterrents, making them more economical to operate.

(e) The current inducer can coexist with daily plant operations more easily than other fish bypass alternatives.

(f) The use of current inducers can allow larger trashrack bar spacing. Reduced trashrack bar spacing increases head loss and reduces power output. It also creates maintenance problems with the seasonal installation of bars and with additional debris catching between the narrow bars.

(g) Another advantage of the current inducer is that when guiding fish species that move near the surface, the current created will also move floating river trash. In situations where fish are guided to a bypass and sluice to avoid the dam, this would greatly reduce trash handling at the site. An additional benefit to the trash bypass is that any living organisms near the water surface are pushed to the bypass. This is especially important for organisms, such as fish larvae, that would otherwise float downstream with the river flow and enter the intake.

(h) The use of the current inducer can result in the savings of water, and therefore money. The bypass flow can be reduced because this flow does not need to generate an influencing current in the forebay, thus enabling more water to be directed to the turbine. At locations where controlled spills or drawdowns are necessary to provide a downstream current, the current inducer can provide a leading current with a full headpond.

(i) This system is likely to keep fish in a natural river environment. This results in a reduction of disease transmission from those fish that are crowded during mechanical transport. A natural river environment with no fish interface with mechanical structures reduces impingement and descaling of the fish. With the fish continuously moving in conjunction with the current, they are less likely to suffer from high temperature or predators, or, in the case of salmon, revert back to smolts. An in-river fish run also gives the fisheries management program a more positive public image.

Figure 2:
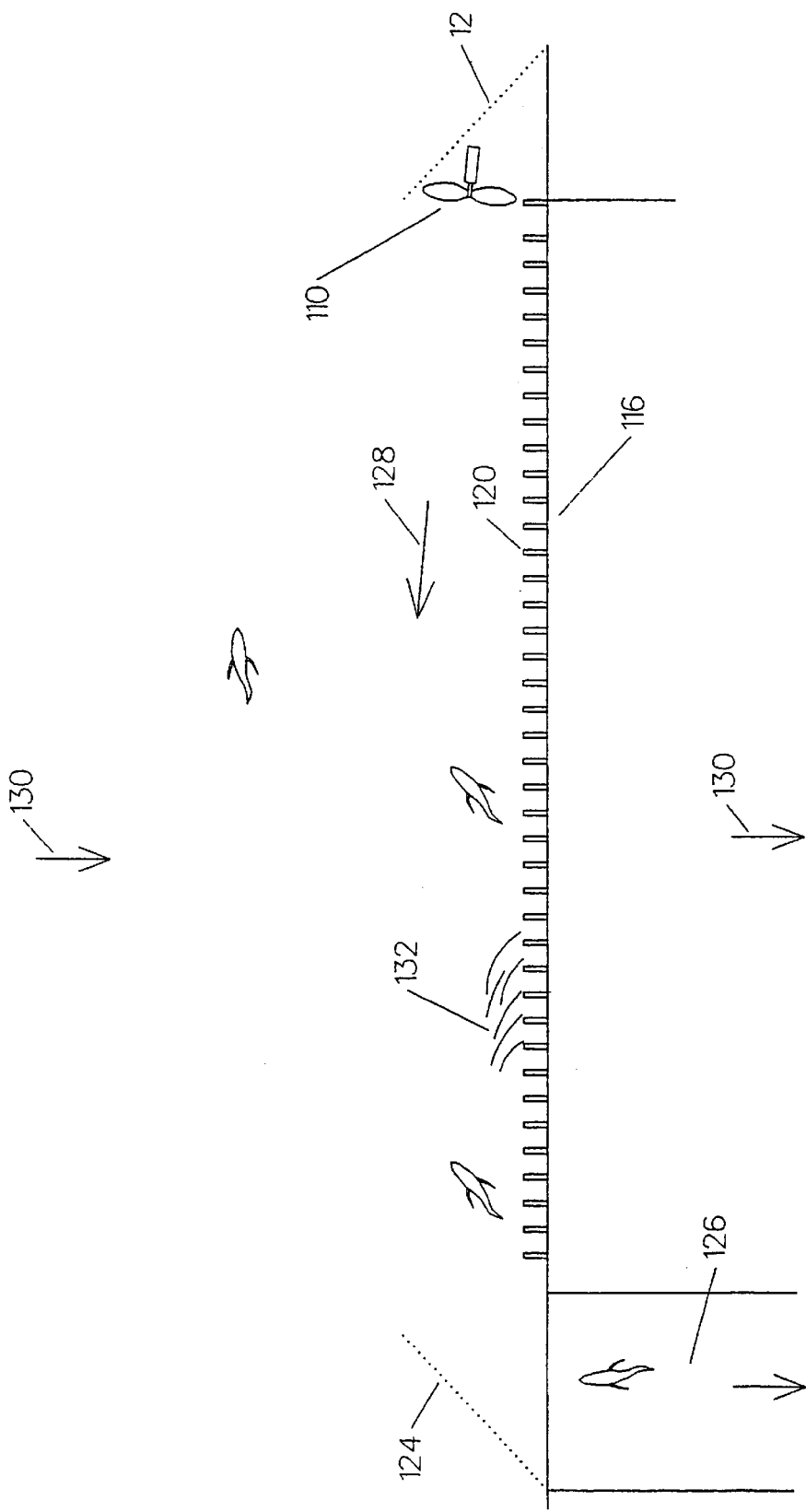
FIG. 2 shows a current inducer according to the present invention positioned to utilize trashrack bars as a louver.

An alternative embodiment of the present invention is explained with reference to FIG. 2. In general, a louver is a widely accepted method of fish guidance. Louvers consist of an array of evenly spaced vertical slats aligned across a channel which lead to a bypass. The turbine flow passes through the slats, but the slats create hydraulic conditions which the fish detect and avoid. The fish move laterally away from the turbulence, and gradually downstream with the current into the bypass. The historic problem with louvers has been that the turbulence varies with turbine flow, and thus the system is not always running at peak efficiency.

The present invention provides a solution to fish guidance problems using the louver concept. In this scenario, the trashrack bars 120 act as louver bars and a current inducer 110 is set at one end of the trashrack 116. A fine mesh trashrack 122 is positioned at the intake of the current inducer 110 and a fine mesh lead screen 124 is positioned leading to the bypass 126.

The current inducer 110 is positioned to create a resultant current vector 128, which, when combined with the turbine flow 130, is perpendicular to the turbine intake. This forms turbulence 132 at the trashrack bars 120 and creates a flow lead across the trashrack 116 to the bypass 126. Fish reject this turbulence 132, which is consistent at all turbine flows. The lead screen 124 helps to direct the fish into the bypass 126. The fine mesh trashrack 122, on the suction side of the current inducer 110, prevents debris and fish from directly engaging the propeller blades.

In a manner similar to that described above and in FIG. 2, current inducers may be used in conjunction with fish screens. Fish screens are a fine mesh screen used to overlay the trashrack bars, thus decreasing the open area available for fish to enter the intake. The typical problem with fish screens arises when the intake velocity is high, and, because of the reduced intake area, fish are impinged on the screen. This problem is exacerbated when the screen is allowed to foul, further reducing the intake area and increasing the intake velocity at the nonfouled areas. By creating a current parallel to the fish screen, the fish and trash are pushed off the screen to the bypass.

In locations with long intakes or high turbine flows, it may not be feasible to use a propeller and motor system that will create a current above the minimum velocity threshold across the entire intake. For long lengths of intake where the current induced at one end of the trashrack 216 will not adequately reach the bypass 226, multiple current inducers 220 may be placed along the trashrack 216 such that there is a current perpendicular to the trashrack for the entire length of the trashrack 216. See FIG. 3.

Figure 3:
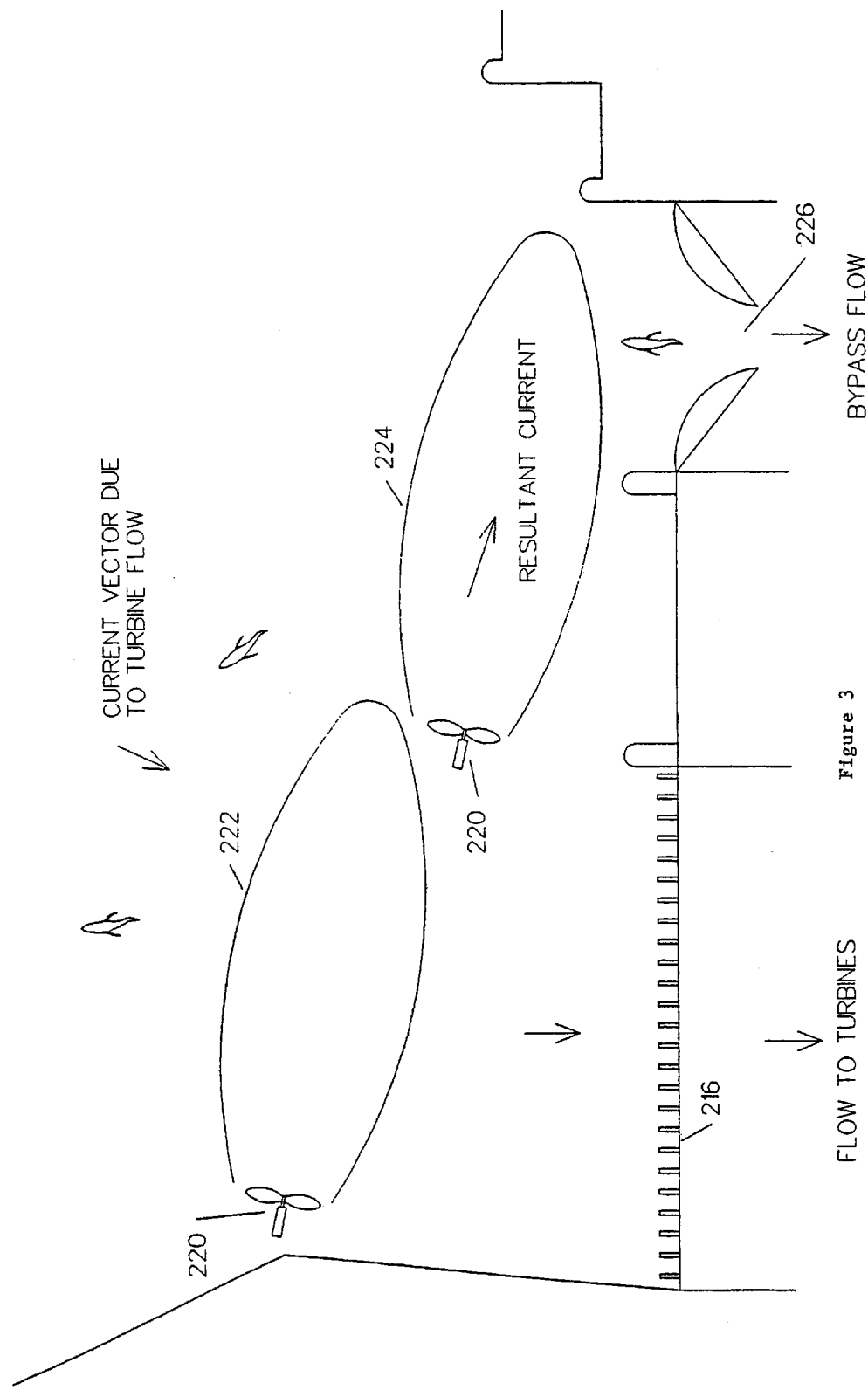
FIG. 3 shows multiple current inducers according to the present invention creating a continuous current lead across a long intake.

If only one current inducer was to be used in a situation with a long intake region, the current inducer would have to be angled at a steep angle to the incoming current for this current to reach the bypass. This is not a well defined current lead for fish to follow. Accordingly, it is better to place several current inducers 220 in line, as is shown in FIG. 3. This provides a strong, well defined current field across the entire bypass.

In this embodiment, it is preferable that the initial current field 222 ends upstream of the second current inducer 220 so as to overlap with the current field 224 of the second current inducer 220. This overlapping of the two induced current fields 222, 224 reduces the chance of fish passing between the influence of the two adjoining current inducers.

Figure 4:
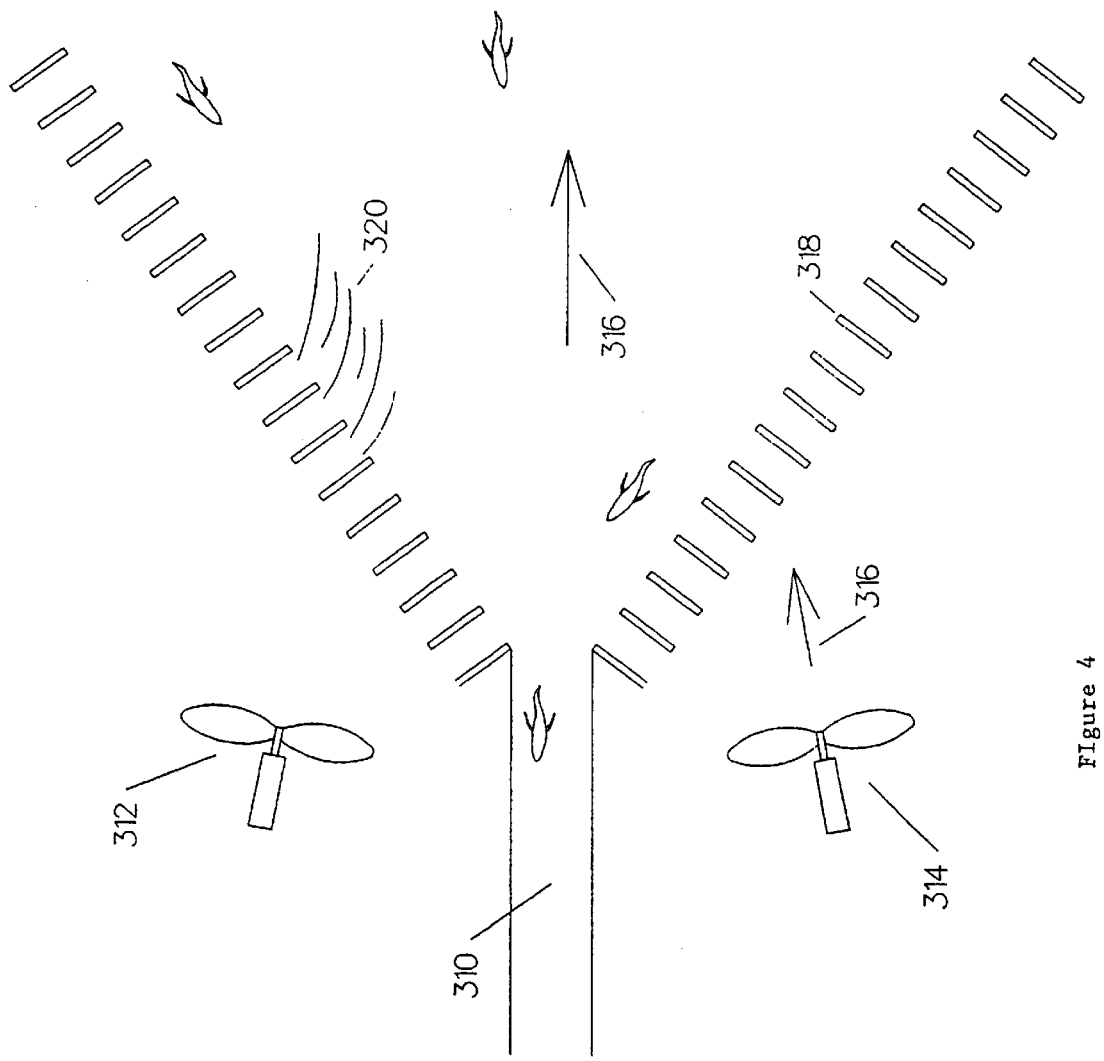
FIG. 4 shows current inducers according to the present invention creating attraction current for an upstream fishway.

FIG. 4 illustrates an application of the present invention in an upstream fishway 310. In this embodiment, two current inducers 312, 314 are used, one on each side of the fishway entrance, to provide an attraction current 316 through angled bars 318 leading to the entrance. This enables the creation of a large, defined current field, with turbulence 320 created by the louver bars 318 directing the fish to the fishway entrance. This has a greater effectiveness as a current lead than typical upstream fishways that use a static head differential to generate an attraction current.

In some instances, such as in large reservoirs with surface current flow leading away from the dam area, surface collectors (or "gulpers") are used to collect fish. These fish are then trucked around the dam. These surface collectors are massive, floating structures that provide attraction current by pumps mounted below the structure under screens. These pump down, and their suction pulls water over an entrance weir. The problem with these systems is that their current influence field is very small, so the structure must be positioned carefully to take advantage of natural surface currents. They are also expensive to construct.

FIGS. 5(*a*) and 5(*b*) illustrate an improvement over a conventional surface collector by utilizing current inducers to provide an attraction current to a collector. FIG. 5(*a*) is an elevation view of a surface collector according to the present invention, and FIG. 5(*b*) is a plan view of the surface collector. In the FIG. 5(*a*) and 5(*b*) system, multiple current inducers 410, 412 are hung from a float 414. Lines 416 run from the float 414 to a rigid frame 418 which acts as the entrance to the collector. A net 420 is attached to the frame 418 and to floats 422 at the water surface. The base of the frame 418 is attached to a single mooring point. The net 420 necks down to a collection box 424 at the cod end.

When the current inducers 410, 412 are activated, they create a current field leading to the entrance of the net 420. The size of this field is limited by the current field of the motor and propeller, which is matched to the rope length between the current inducers and the net frame 418. This field size is much greater than that of conventional surface collectors. Once the fish enter the net frame 418, they continue traveling down the net 420 and into the floating collection box 424 for holding. The benefits of this collection system are the economy of construction and deployment, flexibility of location, and the large current field for attraction current.

In some large bodies of water, such as reservoirs, there is little cell-to-cell current continuity during periods of low flow. Thus, the fish have no defined current to orient on during their migration. On the Columbia River there have been many expensive solutions. These include an extensive barging and trucking program, massive drawdowns to create a flow to the dam, resulting in loss of potential power, and even removal of dams. A recent study has suggested constructing a pipeline the length of the Columbia River. This pipeline would have a series of pumps to create a current throughout its length, and would pass the salmon run along the entire river.

Figure 6:
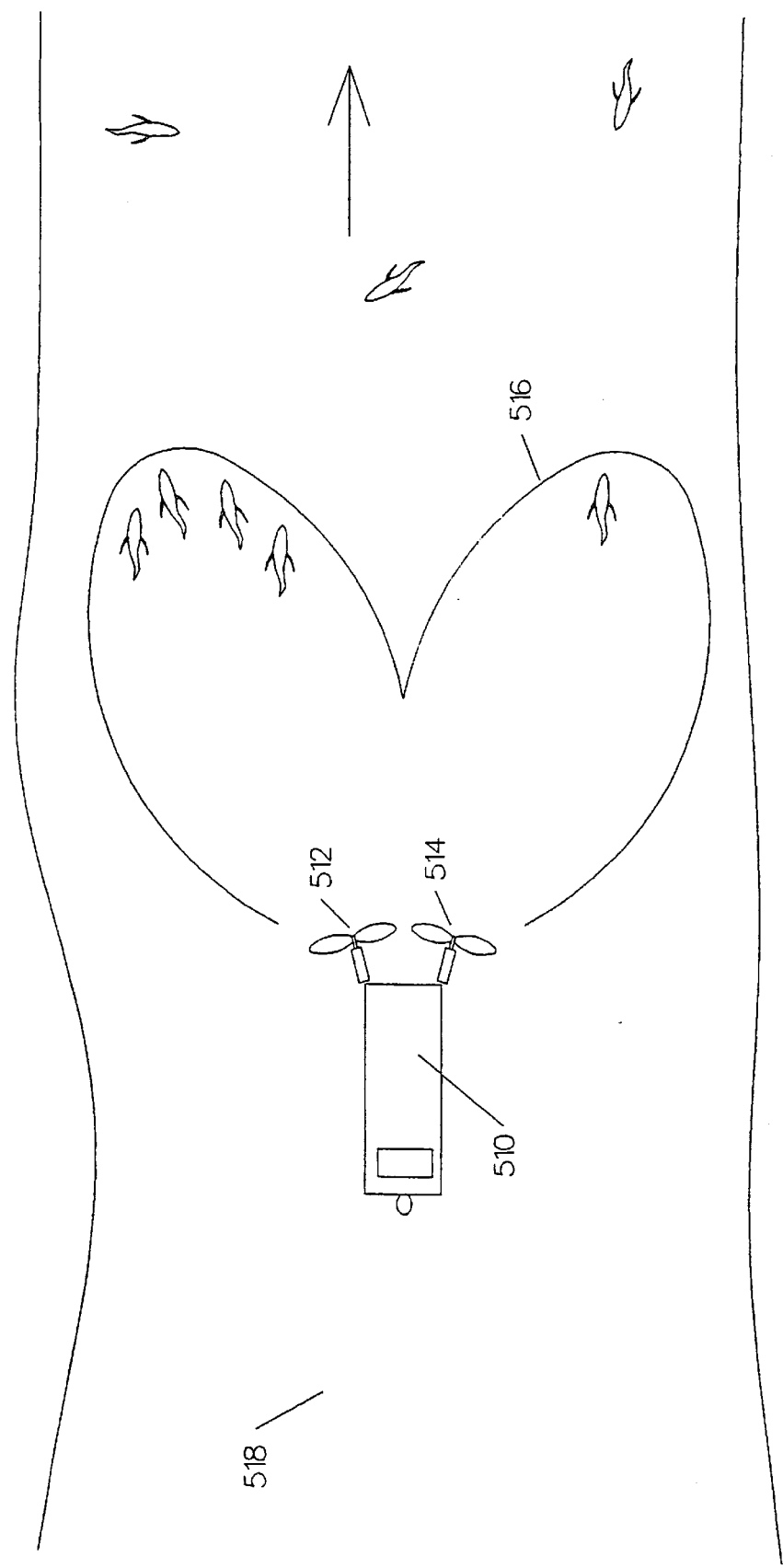
FIG. 6 shows barge mounted current inducers according to the present invention used to move fish through low velocity areas.

A more cost effective solution to this problem would be to mount several current inducers 512, 514 on a barge 510. See FIG. 6. These current inducers 512, 514 would be placed to have a current field 516 width similar to that of the river. The barge 510 would proceed downstream at peak fish movement times with the current inducers 512, 514 operating, effectively herding the fish. This process could be repeated multiple times depending on its efficiency. An alternative solution to this problem is to mount multiple current inducers in series directly in the river. They would be installed such that their current influence fields overlap similar to that shown in FIG. 5. Current inducer installation would only be necessary in low current areas, and would not incur the massive civil works expenses associated with a pipeline the length of the river. Either of these options would be considerably less expensive than some of the present alternatives.

An additional application of the current inducer improves fish bypass reducing predation. In many situations, fish migrating downstream are successfully diverted around the turbine intakes at hydroelectric sites and into the fish bypass. Often, though, the fish are discharged from the bypass into a low current plunge pool. Due to the high availability of food, predators position themselves in these pools and feed on the species being bypassed. A common solution to reduce fish mortality is to position the outfall in the turbine tailrace, such that the current created by the turbine will make it difficult for the predator to remain near the outfall site. The current will also provide a lead to guide the fish being bypassed away from the outfall site. The problem with this system is that the turbine discharge does not always provide a constant current, and many times it is not convenient to run the outfall into the tailrace.

Figure 9:
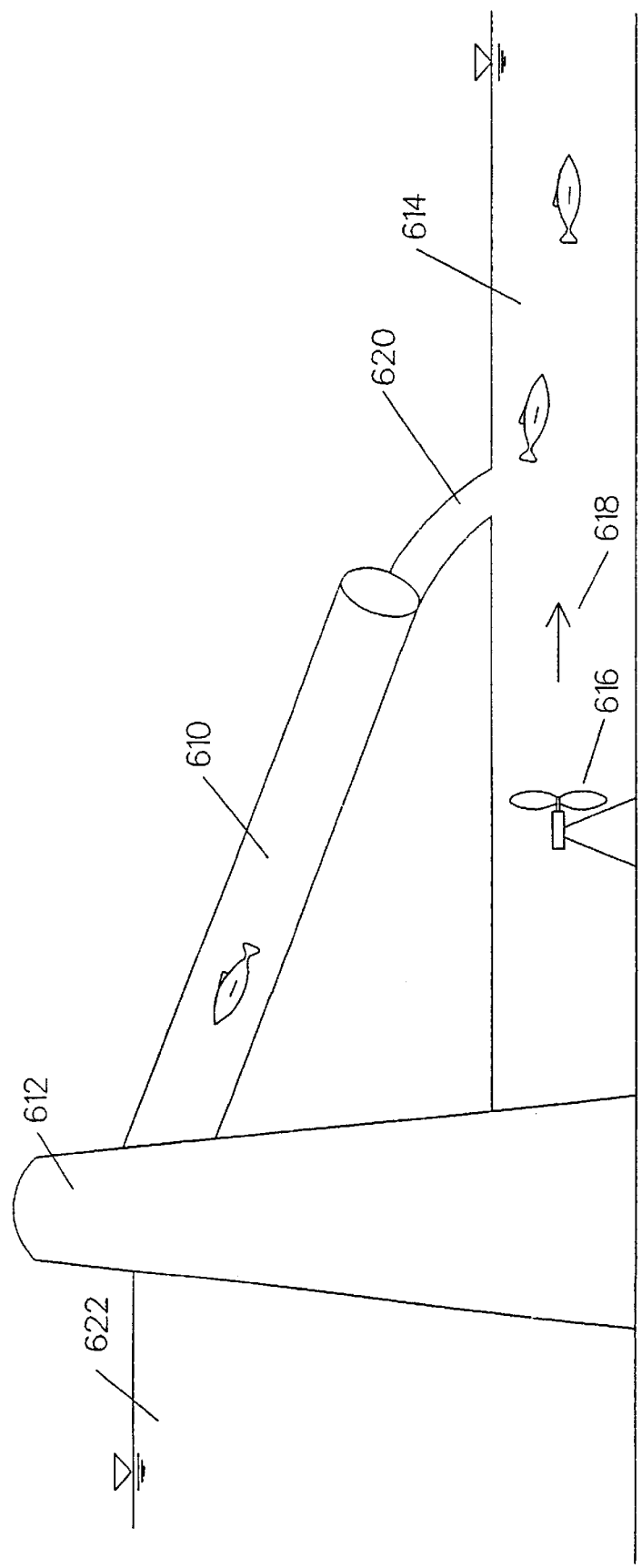
FIG. 9 shows an alternative embodiment of the present invention for use with a bypass outfall.

FIG. 9 shows a fish bypass 610 which leads from a headpond 622 through a dam 612 into a plunge pool 614. In this situation, a current inducer 616 is employed to generate a current 618 in the plunge pool leading away from the outfall 620. This current inducer generates a constant current at all turbine flows. The current inducer also allows the placement of the bypass in any location with a suitable depth plunge pool.

Figure 10:
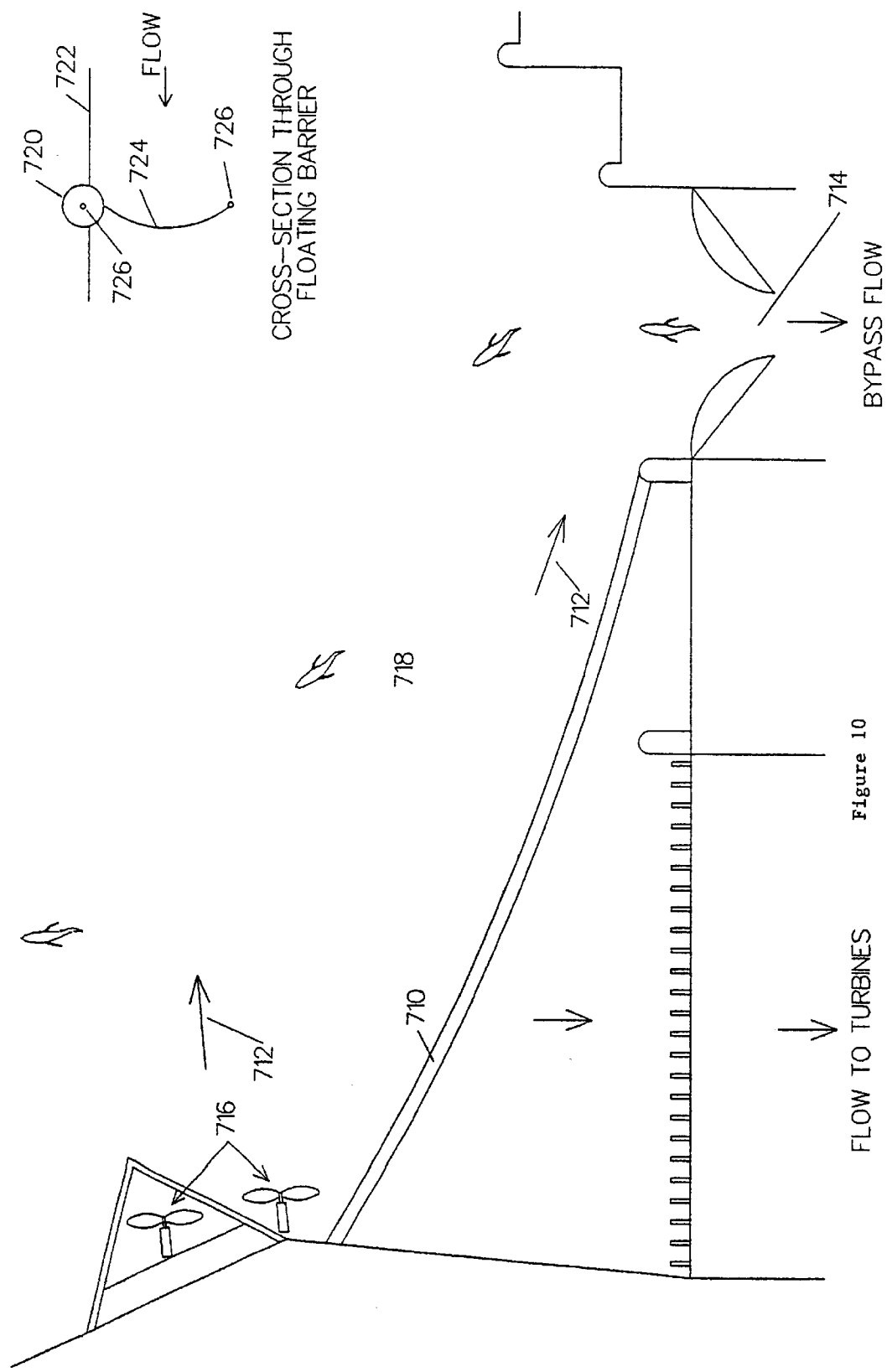
FIG. 10 shows a current inducer according to the present invention that uses a floating barrier to extend the induced current.

An alternative solution to the problems experienced when trying to create a continuous current across long intakes is shown in FIG. 10. Rather than employing multiple current inducers to extend the current across the entire intake, a floating barrier 710 is deployed to carry the surface current 712 to the bypass 714. In this case, only the shore side current inducers 716 may be needed to generate an adequate current, thus eliminating the maintenance problems associated with floating current inducers in the headpond 718. The floating barrier 710 stretches from a point downstream of the current inducers 716 to the downstream edge of the bypass entrance 714. The barrier 710 consists of a float 720 on the water surface 722 which is attached to an impermeable or partially permeable membrane 724 extending into the water column, both of which stretch across the intake. These are held in place by a cable 726 in the float 720 and at the bottom of the membrane 724. The membrane 724 may be 3 to 4 feet deep, depending on the biological characteristics and the depth at which the target species to be bypassed typically travels. These floating barriers 710 may be made from any impermeable or partially permeable material with a high tensile strength, such as Hypalon. They are also available complete as an oil boom.

Thus the reader will see that the current inducer provides a fish guide with many advantages over the prior art in that:

the device is cost effective because of the use of commercially available components;

the device is cost effective because of its low power requirements and because of reduced water usage associated with the device;

the device is cost effective because it does not require large structures to create a static head differential;

the device is operator friendly because it is easy to install, maintain, and it can simplify trash problems at water intakes;

the device can produce a defined lead in the selected zone of the water column; and the device is biologically and politically popular because it solves fish passage problems in a simple, natural manner.

Although the description above contains many specifics, these should not be construed as limiting the scope of the invention but as merely providing illustrations of some of the presently preferred embodiments of this invention. There are other applications of the current inducer, such as to create a flow where the downstream bypass discharges. This would disperse the species being discharged, and reduce the number of predators in the area.

Thus the scope of the invention should be determined by the appended claims and their legal equivalents, rather than by the examples given.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed:

1. A method of guiding fish through a body of water, comprising the steps of:

providing a propeller in the body of water to initiate a stream of water;

using the propeller to project the stream of water into the body of water; and guiding fish by the accelerated stream of water to swim only along the stream created at the discharge side of the propeller.

2. The method of claim 1, wherein the stream of water is defined with respect to the body of water without conduits to distinguish the stream of water from the body of water.

3. The method of claim 1, further comprising the step of providing a plurality of propellers sequentially along the stream of water.

4. The method of claim 1, wherein the stream of water is defined by a current field generated by the propeller.

5. The method of claim 1, further comprising the step of protecting the propeller by mounting a trashrack on the suction side of the propeller.

6. The method of claim 1, wherein the stream of water is adjacent a water intake, and further comprising the step of controlling the speed of the propeller based on the flow through the water intake.

7. The method of claim 1, wherein the stream of water is adjacent a screen or trashrack and further comprising the step of creating turbulence at the surface of the screen or trashrack in the stream of water as the stream of water passes the screen or trashrack.

8. The method of claim 1, wherein the propeller is mounted in a frame and further comprising the step of adjusting the axis of rotation of the propeller in a vertical plane.

9. The method of claim 8, further comprising the step of adjusting the axis of rotation of the propeller in a horizontal plane.

10. The method of claim 1, wherein the propeller is mounted in a frame and further comprising the step of adjusting the axis of rotation of the propeller in a horizontal plane.

11. The method of claim 1, wherein the propeller is mounted on a barge and further comprising the step of herding fish through low velocity areas in the body of water.

12. The method of claim 1, further comprising the step of herding fish through low velocity areas in the body of water.

13. The method of claim 1, wherein the using step creates a current that is detectable by the fish, and the guiding step includes stimulating the fish to swim in the detected current.

14. An apparatus for generating a current in a body of water to guide fish, comprising:

a propeller;

a device to rotate the propeller;

a substantially rigid frame to mount the propeller and the device to rotate the propeller, the substantially rigid frame permits adjustment of the axis of rotation of the propeller in a vertical plane and in a horizontal plane.

15. The apparatus of claim 14, wherein the substantially rigid frame permits depth adjustment of the propeller.

16. An apparatus for guiding fish away from an obstacle in a moving body of water that is flowing in a first direction, comprising:

a propeller;

a device to rotate the propeller;

a frame to mount the propeller and the device to rotate the propeller, wherein the propeller is mounted upstream of the obstacle and is arranged so as to project a stream of water into the moving body of water at an angle with respect to the first direction in which the moving body of water is flowing so that the projected stream passes across the obstacle.

17. The apparatus of claim 16, wherein the projected stream is detectable by the fish and stimulates the fish to swim in the projected stream.

18. An apparatus for guiding fish away from an obstacle in a body of water, comprising:

a propeller;

a device to rotate the propeller;

a frame to mount the propeller and the device to rotate the propeller, wherein the propeller is arranged so as to project a stream of water into the body of water so that the projected stream passes across the obstacle.

19. The apparatus of claim 18, wherein the projected stream is detectable by the fish and stimulates the fish to swim in the projected stream.

20. An apparatus for generating a current in a body of water to guide fish, comprising:

a propeller;

a device to rotate the propeller;

a frame to mount the propeller and the device to rotate the propeller;

wherein the propeller is mounted to the frame upstream of a trashrack with the propeller axis of rotation substantially parallel to a face of the trashrack and projects a stream of water away from the propeller along the trashrack to utilize the trashrack as a louver to create turbulence.

21. A fish collector, comprising:

a frame;

a net supported by the frame;

a collection box located at a narrowed end of the net;

a current inducer arranged so as to direct a current into the net directed toward the collection box, wherein the current inducer includes a propeller.

22. An upstream fishway, comprising:

a fishway passageway;

a pair of sets of louver bars arranged at an entrance to the fishway passage and diverging therefrom;

a current inducer located at an upstream side of each of the sets of louver bars so as to create turbulence at an upstream side of each of the sets of louver bars.

23. The upstream fishway of claim 22, wherein the current inducers include a propeller and a device to rotate the propeller.

* * * * *